United States Patent
Hegenbart et al.

(10) Patent No.: US 9,745,045 B2
(45) Date of Patent: Aug. 29, 2017

(54) DOOR STOP ELEMENT FOR AN AIRCRAFT DOOR

(71) Applicant: Airbus Operations GmbH, Hamburg (DE)

(72) Inventors: Matthias Hegenbart, Hamburg (DE); Torsten Noebel, Hamburg (DE); Liu Wang, Hamburg (DE); Michael Sauer, Hamburg (DE); Memis Tiryaki, Kreetslag (DE); Dirk Elbracht, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/019,506

(22) Filed: Feb. 9, 2016

(65) Prior Publication Data

US 2016/0280354 A1 Sep. 29, 2016

(30) Foreign Application Priority Data

Feb. 11, 2015 (DE) ........................ 10 2015 101 981

(51) Int. Cl.
*B64C 1/14* (2006.01)
*A47B 97/04* (2006.01)
(Continued)

(52) U.S. Cl.
CPC ............ *B64C 1/1461* (2013.01); *A47B 97/04* (2013.01); *E05F 5/02* (2013.01); *E05F 5/025* (2013.01);
(Continued)

(58) Field of Classification Search
CPC ..... E05C 17/54; B64C 1/1461; B64C 1/1407; E05F 5/025; E05F 5/06; E05F 5/02;
(Continued)

(56) References Cited

U.S. PATENT DOCUMENTS 3,328,065 A * 6/1967 Arenson ................. E05C 17/54
16/86 A
5,697,656 A * 12/1997 Hebert .................... E05C 17/54
16/82
(Continued)

FOREIGN PATENT DOCUMENTS

| DE | 10 2008 055 666 A1 | 5/2010 |
| DE | 10 2008 043 023 A1 | 7/2010 |
| DE | 10 2011 114 457 B4 | 2/2014 |

OTHER PUBLICATIONS

German Office Action for Application No. 10 2015 101 981.7 dated Feb. 11, 2016.
German Search Report for Application No. 10 2015 101 981.7 dated Aug. 20, 2015.

*Primary Examiner* — William Miller
(74) *Attorney, Agent, or Firm* — Jenkins, Wilson, Taylor & Hunt, P.A.

(57) ABSTRACT

A door stop element for an aircraft door has a body which is formed at least approximately L-shaped, and which has at least one contact area on the outer side of one of the legs for fixed contact on the aircraft fuselage, and a stop surface on the inner side of the other leg for the aircraft door. The body has a cavity, on the inner side of which adjacent to the stop surface a rib is provided, which extends through the stop surface symmetrically on both sides of the longitudinal median plane that extends perpendicular to the stop surface.

13 Claims, 6 Drawing Sheets

(51) Int. Cl.
   *F16B 1/00* (2006.01)
   *E05F 5/06* (2006.01)
   *E05F 5/02* (2006.01)
(52) U.S. Cl.
   CPC .............. *E05F 5/06* (2013.01); *F16B 1/00* (2013.01); *E05Y 2900/502* (2013.01); *E05Y 2900/531* (2013.01); *Y10T 16/61* (2015.01)
(58) Field of Classification Search
   CPC ... Y10T 16/61; Y10T 16/6285; Y10T 16/628; A47B 97/04; F16B 1/00; E05Y 2900/502; E05Y 2900/531
   USPC .................. 16/82, 86 A, 86 R; 292/342, 343, 292/DIG. 15; 244/129.5
   See application file for complete search history.

(56) References Cited

U.S. PATENT DOCUMENTS

| | | | |
|---|---|---|---|
| 5,711,560 A * | 1/1998 | Gilbertson | E05C 17/54 292/343 |
| 7,644,964 B2 * | 1/2010 | Bushey | E05C 17/54 16/82 |
| D644,084 S * | 8/2011 | Canavan | D8/88 |
| 8,240,722 B2 | 8/2012 | Dieling et al. | |
| 8,783,615 B2 | 7/2014 | Wolf et al. | |
| 8,783,616 B2 | 7/2014 | Roser et al. | |
| 9,145,196 B2 | 9/2015 | Paul | |
| 2013/0032661 A1 | 2/2013 | Roser et al. | |

* cited by examiner

DOOR STOP ELEMENT FOR AN AIRCRAFT DOOR

CROSS-REFERENCE TO RELATED APPLICATION

This application claims priority to German Patent Application No. 10 2015 101 981.7 filed Feb. 11, 2015, the entire disclosure of which is incorporated by reference herein.

TECHNICAL FIELD

The disclosure herein relates to a door stop element for an aircraft door, the body of which is formed at least approximately L-shaped and which has at least one contact area on the outer side of one of the legs for fixed contact on the aircraft fuselage and a stop surface on the inner side of the other leg for the aircraft door.

BACKGROUND

Such door stop elements, which consist, for example, of a solid body forged or cut from titanium, are fixed in large numbers in the area of the door opening on the fuselage of the aircraft so as to allow, by their stop surface, a stable and precisely positioned contact of the aircraft door in the closed state.

SUMMARY

An objective of the disclosure herein is to improve the known door stop elements so that, while having a reduced weight, they have adequate stability with regard to the stress resulting from the contact with the aircraft door.

In order to achieve this objective, a door stop element of the type described at the outset is formed according to the disclosure herein such that the body has a cavity, on the inner side of which adjacent to the stop surface a rib is provided, which extends symmetrically on both sides of the longitudinal median plane through the stop surface which plane extends perpendicular to the stop surface.

Thanks to the design of the door stop element with a cavity, the weight of the element is reduced, while adequate stability is ensured by the rib provided on the inner side of the cavity, which rib extends in the area of the door stop element subject to significant stress, in particular if the rib is provided in the area of the lower end of the stop surface. Furthermore, such a design has proven to be load path- and tension-appropriate.

Excellent stability is obtained in particular when the rib extends at a constant height up to the side walls of the cavity.

In another form, the rib can extend towards the side walls in the area of the inner surface of the cavity adjacent to the stop surface on both sides of the longitudinal median plane, and merge in this area into the side walls while decreasing in height. This results in a stabilization of the side walls, which allows a reduction in their thickness.

A further reduction of the total weight of the door stop element is obtained when the side walls of the cavity have at least one pair of openings, which have the same shape and which face one another.

A pair of first openings can thus be provided between the extension of the stop surface towards the one leg and the outer side of the other leg, below the rib. Because lesser forces occur in this area in the event of stress, these openings can be relatively large.

A pair of second openings can be provided between the extension of the stop surface towards the contact area and the free end of the one leg. Furthermore, a pair of third openings can be provided between the pair of first openings and the pair of second openings.

The pairs of second and third openings can be connected to one another in the central section of the body, which results in a further reduction of the weight, and they can be separated from one another in the area of the side walls of the body by diagonal struts, which are inclined starting at the first leg towards the stop surface, and thus ensure support of the contact area.

When the first leg has a first floor opening in the central section of the body below the pairs of second openings to allow further weight reduction, and in this area the side walls of the floor opening are strut-shaped and extend at a right angle to the diagonal struts, the strut-shaped side walls and the diagonal struts form a support in the manner of a framework, which results in a high level of stability.

To allow further weight reduction, the first leg can have a second floor opening below the first openings.

In one preferred form of the door stop element according to the disclosure herein, the outer area of the other leg can be narrower than the part of the contact area adjoining same.

The distance of the stop surface from the parallels thereto through the point of intersection of the outer surfaces of the legs can be, for example, 39% to 46%, in particular 41% to 44% of the entire length of the one leg.

The door stop element according to the disclosure herein can, for example, be cut from titanium or produced from titanium powder using a 3D printing process.

BRIEF DESCRIPTION OF THE DRAWINGS

The disclosure herein is explained in greater detail below with reference to the figures which show exemplary embodiments.

DETAILED DESCRIPTION

Figure 1:
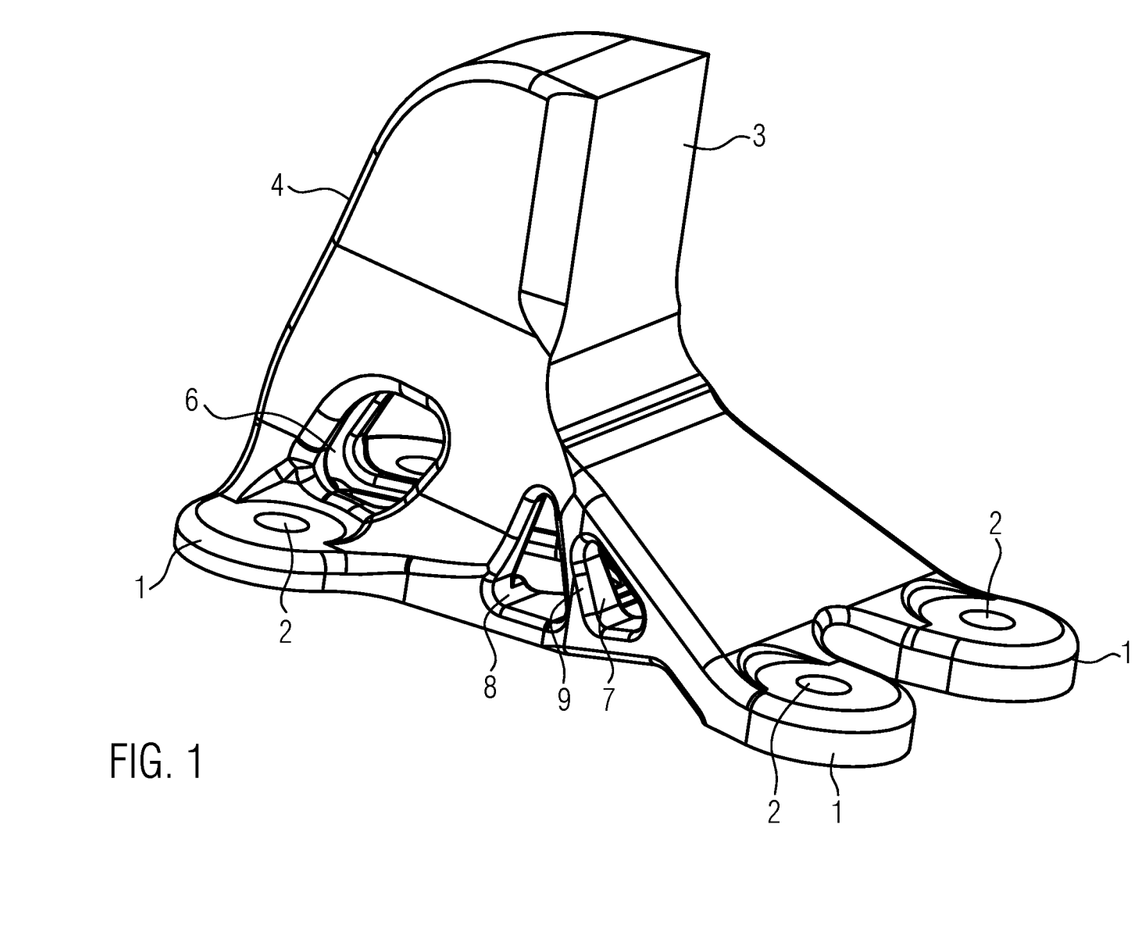
FIG. 1 shows in a perspective view a door stop element.
Figure 2:
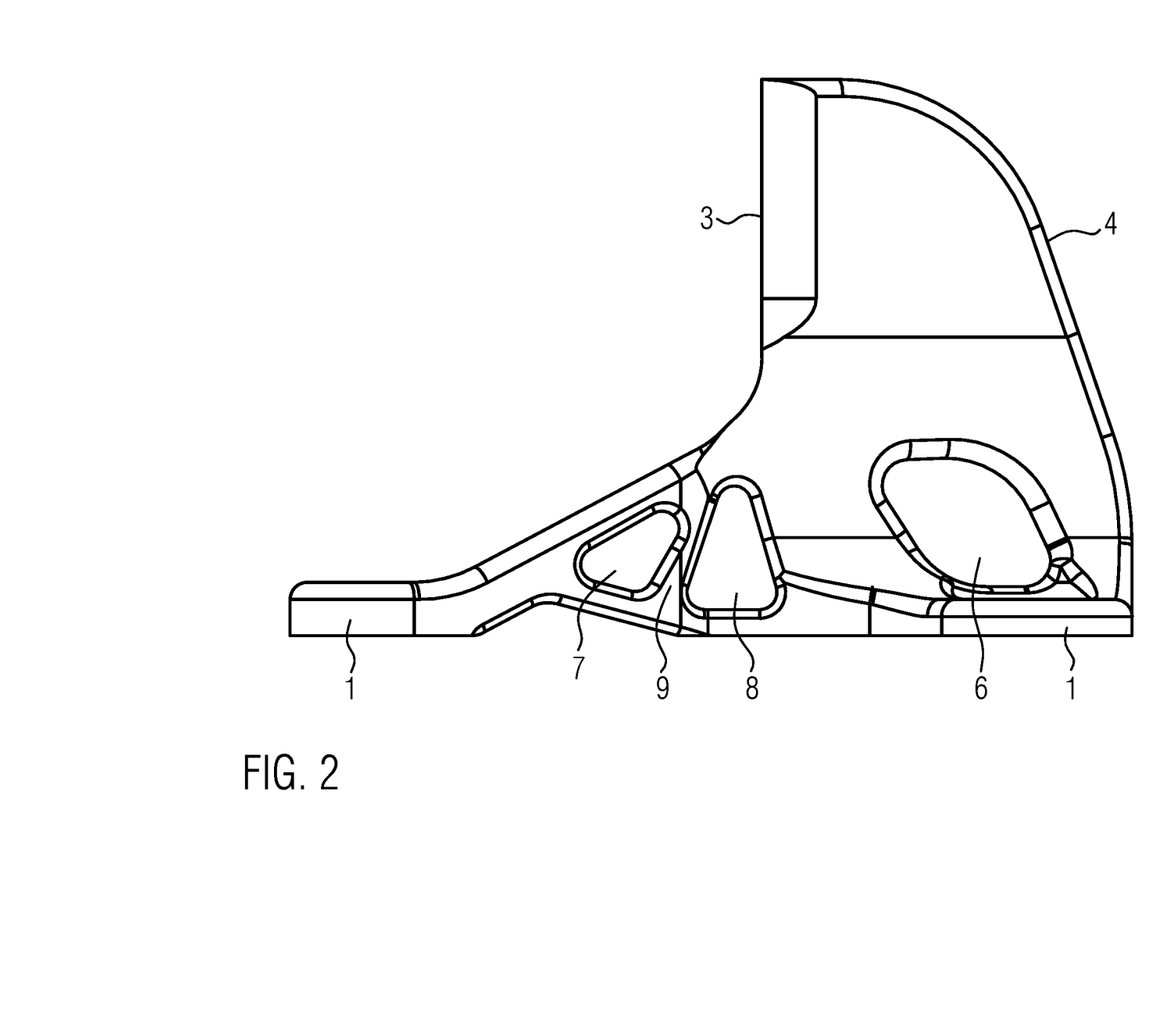
FIG. 2 shows a side view of the door stop element shown in FIG. 1.

The door stop element shown in views in FIGS. 1 and 2 is formed approximately L-shaped, wherein the one leg, which is lower in the figures, has lobular contact areas 1 with bores 2 for fixing to the aircraft fuselage by screws, wherein the contact areas 1 on the free end of this leg project towards the longitudinal extension of the leg, while the rear contact areas 1 closer to the other leg project laterally. The other leg extends substantially between the planar stop surface 3 formed on its inner side and the outer side 4 of this leg, and as can be seen in particular in FIG. 4, the width of this leg is significantly smaller than the width of the contact area 1 adjoining same.

The width of the leg having the stop surface between the stop surface 3 and the parallels thereto through the point of intersection of the outer surfaces of the leg is, as can be seen in FIG. 2, less than half of the total length of the leg having the contact areas 1 and, in the case shown, is approximately 43%.

Figure 3:
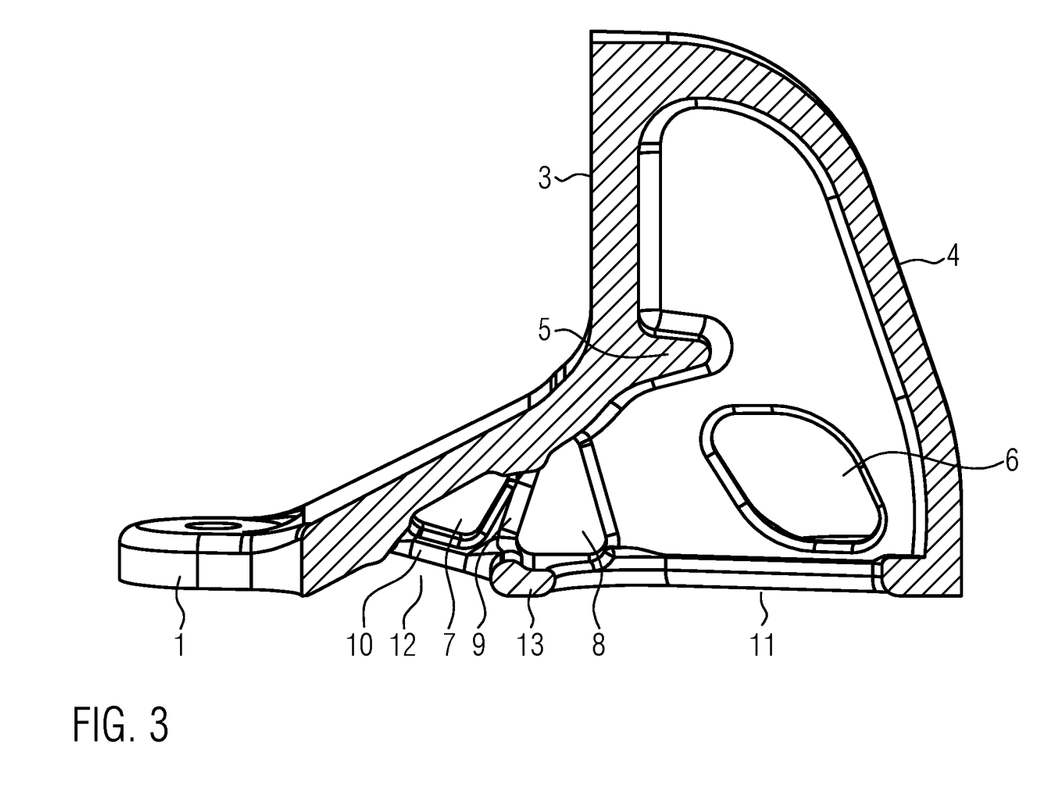
FIGS. 3 through 5 show perspective sectional views from different directions, wherein the section extends through the center of the door stop element.
Figure 4:
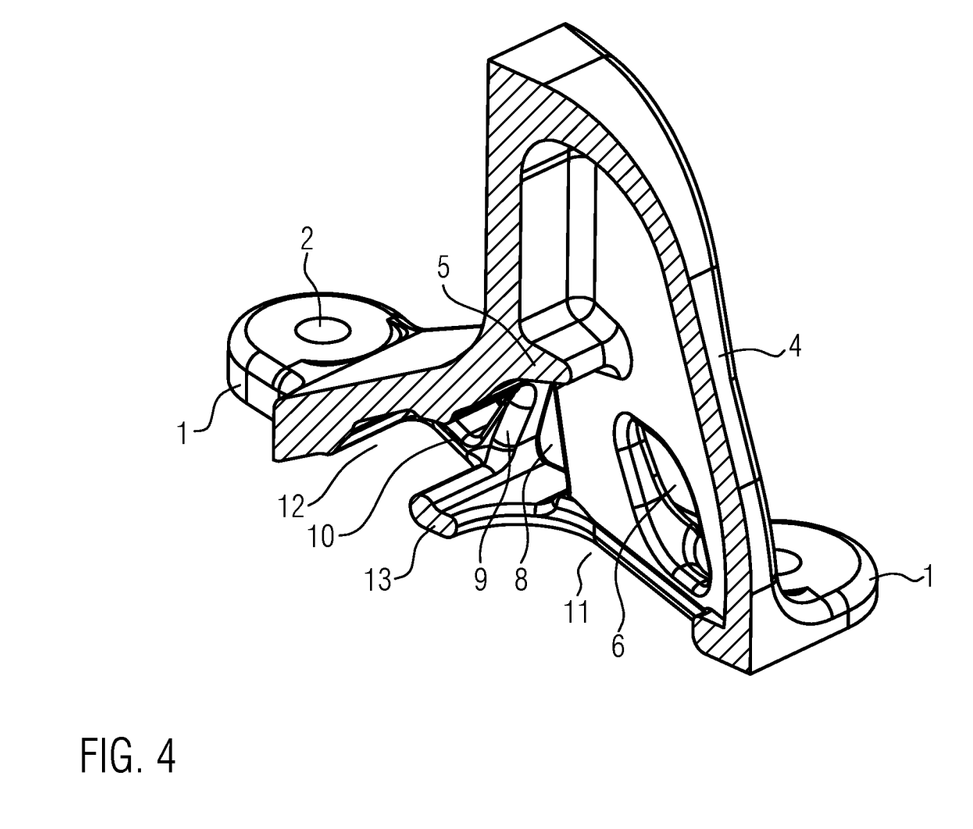
Figure 5:
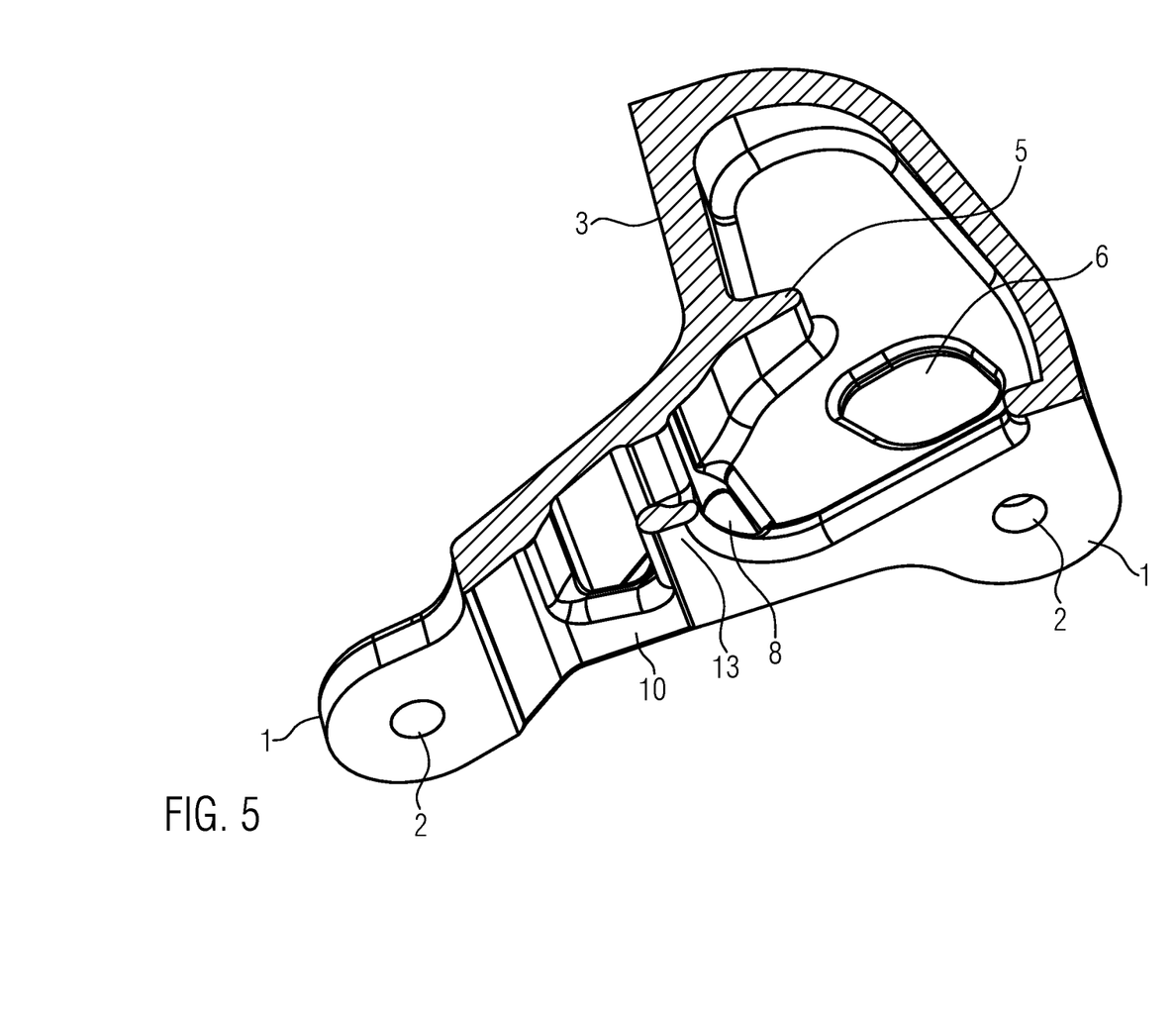

As is shown, in particular, in FIGS. 3 through 5, the body of the door stop element is substantially hollow, and formed on the wall of the cavity having the stop surface 3, on its inner surface or inner side, approximately at the level of the lower end of the stop surface 3, is a rib 5 which extends through the stop surface 3 symmetrically to the sectional plane according to FIGS. 3 and 5, i.e., the longitudinal median plane. The rib 5 is rectilinear and has a constant cross-sectional shape over its entire extension. It merges into the side walls delimiting the cavity.

Below the rib 5 in the side walls, a pair of first openings 6 is provided between the extension of the stop surface 3 towards the leg having the contact areas 1 and the outer side 4 of the other leg, which openings have the same shape and are aligned flush with one another. A pair of second openings 7 in the side walls of the door stop element is located between the extension of the stop surface 3 towards the leg having the contact areas 1 and the free end of this leg, while a pair of third openings 8 is provided between the pairs of first openings 6 and second openings 7. An opening 12 is provided in the central area below the openings 7 in the leg having the contact areas 1, which opening has strut-shaped side walls 10. Extending from these strut-shaped side walls 10 at the rear end are the struts 9 separating the openings 7 and 8, which struts are parts of the side walls 10 and extend from the leg having the contact areas 1 diagonally towards the stop surface 3. The strut-shaped side wall areas 10 starting from the lower ends of the struts 9 extend at a right angle to these struts. This creates a framework-like reinforcement.

In order to obtain a further reduction of the weight, a second floor opening 11, which is separated from the opening 12 below the openings 7 by a transverse section 13, is formed below the first openings 6 in the leg having the contact areas 1.

Figure 6:
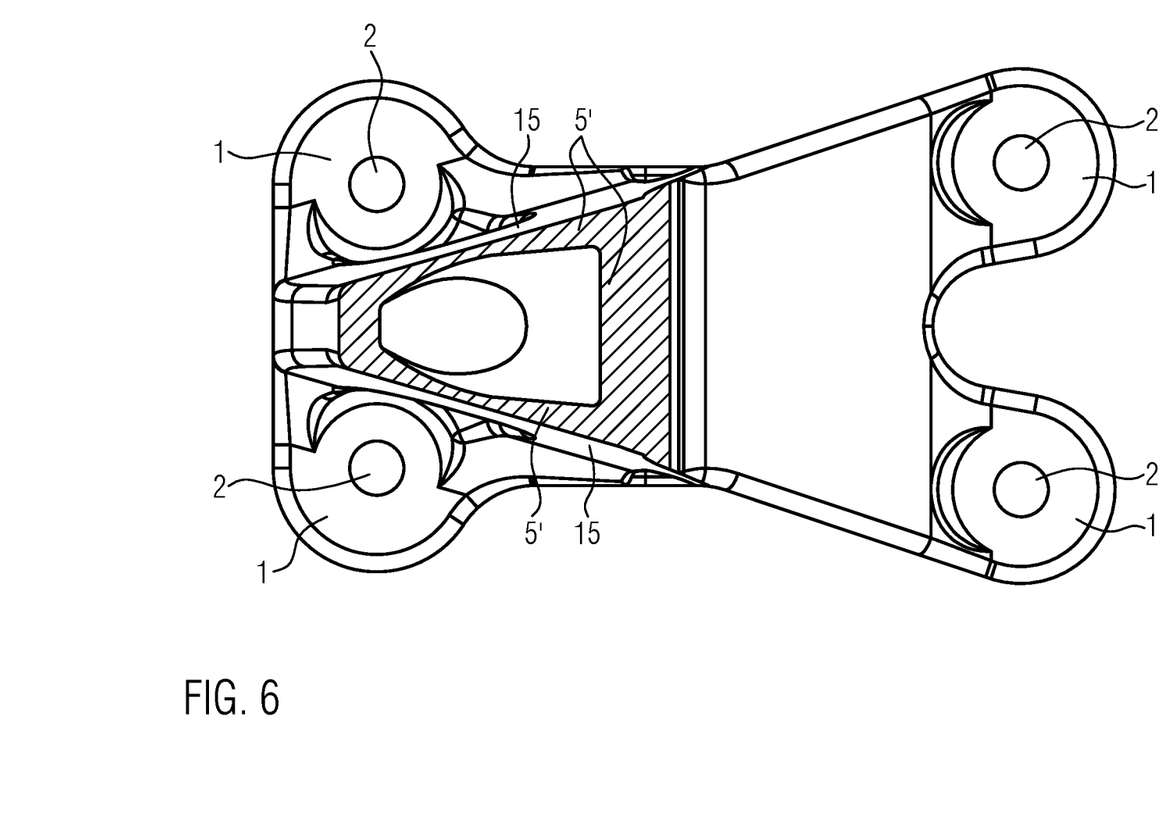
FIG. 6 shows a horizontal section through a door stop element according to FIG. 2 at the level of the rib with a modified rib shape.

The design of the door stop element shown in FIG. 6 corresponds substantially to that of FIGS. 1 to 5, and similar parts and areas are therefore identified with the same reference numerals as in FIGS. 1 through 5.

Unlike FIGS. 1 through 5, the rib 5', which can lie at the same height as the rib 5, runs on the inner surface of the cavity adjacent to the stop surface 3 symmetrically to the median surface through the stop surface and parallel to the selected sectional plane. In the outer areas, the rib 5' merges into the side walls 15, thereby reinforcing the latter.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A door stop element for an aircraft door on an aircraft fuselage, the door stop element comprising:
a body having a form that is at least approximately L-shaped, the body comprising:
at least one contact area on an outer side of a first leg for fixed contact on the aircraft fuselage;
a stop surface on an inner side of a second leg for the aircraft door; and
a cavity, on an inner side of which a rib is located adjacent to the stop surface,
wherein the rib extends symmetrically on both sides of a longitudinal median plane through the stop surface,
wherein the longitudinal median plane extends perpendicular to the stop surface, and
wherein side walls of the cavity have at least a first pair of openings comprising a same shape and facing each other.

2. The door stop element according to claim 1, wherein a distance of the stop surface from parallel lines thereto through a point of intersection of outer surfaces of the legs is 39% to 46% of an entire length of the first leg.

3. The door stop element according to claim 1, wherein the rib is disposed in an area of a lower end of the stop surface.

4. The door stop element according to claim 1, wherein the first pair of openings is disposed between an extension of the stop surface towards the first leg and the outer side of the second leg, below the rib.

5. The door stop element according to claim 4, wherein the first leg has a floor opening below the first pair of openings.

6. The door stop element according to claim 1, wherein a second pair of openings is disposed between an extension of the stop surface towards the contact area and a free end of the first leg.

7. The door stop element according to claim 6, wherein a third pair of openings is disposed between the first pair of openings and the second pair of openings.

8. The door stop element according to claim 7, wherein the second and third pairs of openings are connected to each other in a central section of the body and are separated from each other in an area of side walls of the body by diagonal struts, which are inclined, starting at the first leg, towards the stop surface.

9. The door stop element according to claim 8, wherein the first leg has a floor opening in the central section of the body, below the second pair of openings, and wherein, in this area, side walls of the floor opening are strut-shaped and extend at a right angle to the diagonal struts.

10. The door stop element according to claim 1, wherein an outer area of the second leg is narrower than a part of the contact area adjoining the second leg.

11. A door stop element for an aircraft door on an aircraft fuselage, the door stop element comprising:
a body having a form that is at least approximately L-shaped, the body comprising:
at least one contact area on an outer side of a first leg for fixed contact on the aircraft fuselage;
a stop surface on an inner side of a second leg for the aircraft door; and
a cavity, on an inner side of which a rib is located adjacent to the stop surface,
wherein the rib extends symmetrically on both sides of a longitudinal median plane through the stop surface,
wherein the longitudinal median plane extends perpendicular to the stop surface, and
wherein the rib extends at a constant height to side walls of the cavity.

12. The door stop element according to claim 11, wherein the rib is disposed in an area of a lower end of the stop surface.

13. A door stop element for an aircraft door on an aircraft fuselage, the door stop element comprising:
- a body having a form that is at least approximately L-shaped, the body comprising:
  - at least one contact area on an outer side of a first leg for fixed contact on the aircraft fuselage;
  - a stop surface on an inner side of a second leg for the aircraft door; and
  - a cavity, on an inner side of which a rib is located adjacent to the stop surface,
  - wherein the rib extends symmetrically on both sides of a longitudinal median plane through the stop surface,
  - wherein the longitudinal median plane extends perpendicular to the stop surface, and
  - wherein the rib extends in an area of the inner surface of the cavity adjacent to the stop surface, on both sides of the longitudinal median plane towards side walls of the cavity and, in that area, merges into the side walls of the cavity while decreasing in height.

* * * * *